(12) United States Patent
Tseng

(10) Patent No.: US 9,075,447 B2
(45) Date of Patent: Jul. 7, 2015

(54) WIRELESS KEYBOARD FOR ARBITRARILY ASSEMBLY AND COMPUTER SYSTEM THEREOF

(75) Inventor: Tien-Chung Tseng, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 100 days.

(21) Appl. No.: 13/452,916

(22) Filed: Apr. 22, 2012

(65) Prior Publication Data
US 2013/0057476 A1    Mar. 7, 2013

(30) Foreign Application Priority Data
Sep. 6, 2011  (TW) .............................. 100132060 A (51) Int. Cl.
G09G 3/36       (2006.01)
G06F 3/023      (2006.01)
G06F 3/02       (2006.01)

(52) U.S. Cl.
CPC ............ *G06F 3/0231* (2013.01); *G06F 3/0202* (2013.01); *G06F 3/0216* (2013.01); *G06F 3/0219* (2013.01)

(58) Field of Classification Search
CPC .................................................... G06F 3/0202
USPC ................................................. 345/168, 172
See application file for complete search history.

(56) References Cited

U.S. PATENT DOCUMENTS

| | | | |
|---|---|---|---|
| 6,903,662 | B2 | 6/2005 | Rix |
| 2002/0109646 | A1* | 8/2002 | Brauweiler .................... 345/1.2 |
| 2007/0013662 | A1* | 1/2007 | Fauth ............................ 345/168 |

OTHER PUBLICATIONS

Office action mailed on Apr. 24, 2014 for the Taiwan application No. 100132060, filing date: Sep. 6, 2011, p. 1 line 12-14 and p. 2 line 1-24.

* cited by examiner

*Primary Examiner* — Roy Rabindranath
(74) *Attorney, Agent, or Firm* — Winston Hsu; Scott Margo (57) ABSTRACT

A wireless keyboard comprises at least a keystroke each comprising a first resonating circuit for responsing a first wireless signal to provide a power source, a chip storing a key data, and a switch coupled between the first resonating circuit and the chip for conducting a connection between the first resonating circuit and the chip when receiving an external force, to transmit the power source provided by the first resonating circuit to the chip, such that the chip outputs the key data as a second wireless signal via the first resonating circuit, and a reader coupled to a computer system for emitting the first wireless signal to the each keystroke and responsing the second wireless signal outputted by the each keystroke, so as to determine commands inputted to the computer system.

8 Claims, 7 Drawing Sheets

WIRELESS KEYBOARD FOR ARBITRARILY ASSEMBLY AND COMPUTER SYSTEM THEREOF

BACKGROUND OF THE INVENTION

1. Field of the Invention

The present invention relates to a wireless keyboard and computer system, and more particularly, to a wireless keyboard and computer system having the flexibility of keystroke allocation to enhance convenience of usage.

2. Description of the Prior Art

Figure 1:
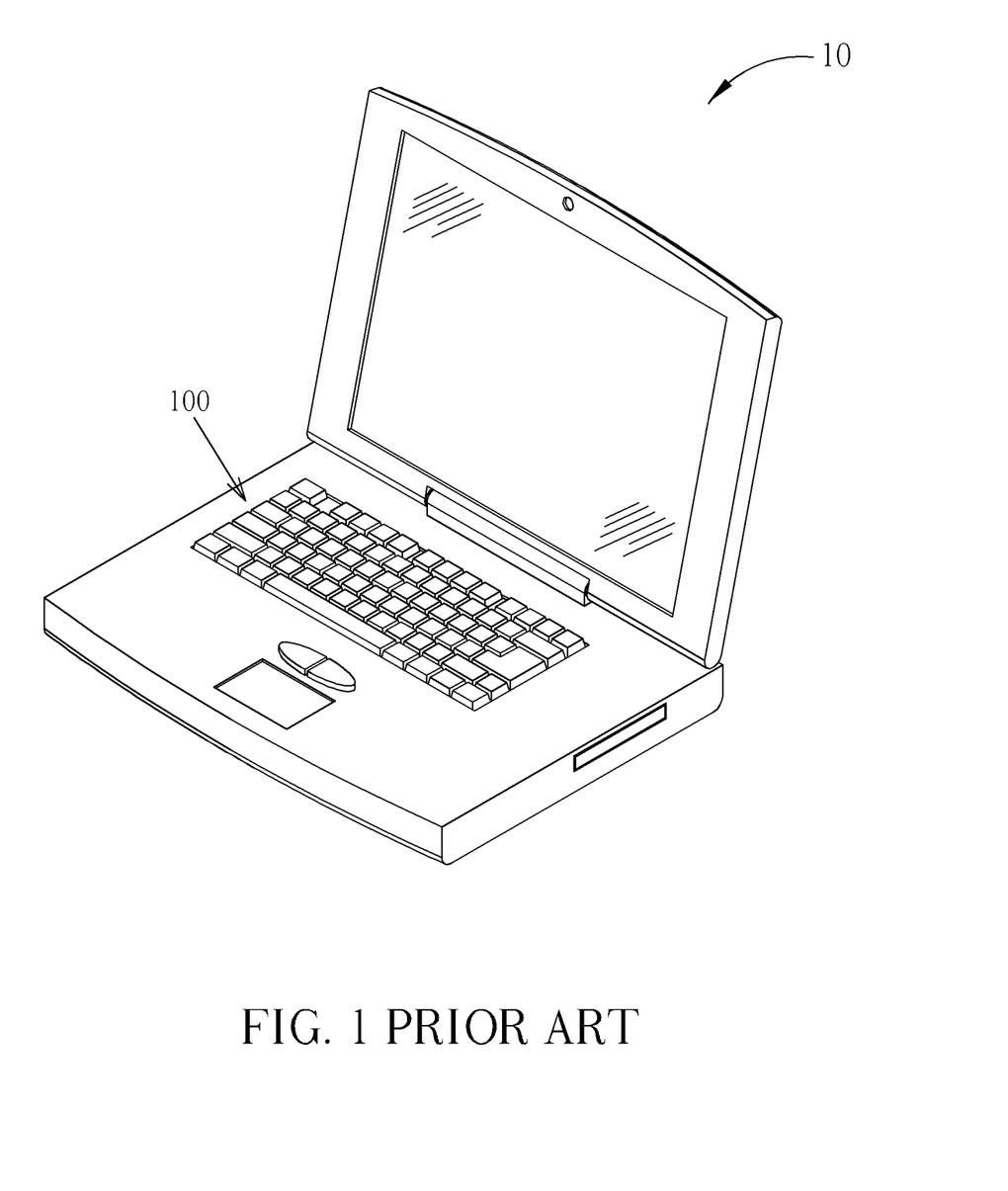
FIG. 1 is a schematic diagram of a laptop according to the prior art.

In a computer system, a keyboard is one of the most essential input devices, and is composed of a plurality of keystrokes. Each of the keystrokes generates a key value or a key code when pressed, such that a keyboard controller of the computer system can determine input signals of a user. For example, FIG. 1 is a schematic diagram of a laptop 10 according to the prior art. The laptop 10 includes a keyboard 100, which has a plurality of keystrokes related to different key codes.

In the keyboard 100, relative positions of the keystrokes are fixed, and a key value (or definition) of a keystroke is also fixed; therefore, a user cannot arbitrarily adjust the positions of the keystrokes, add more keystrokes, and needless to say, define the key value of each keystroke. In other words, the conventional keyboard is not allowed for the user to adjust the position or key value of each keystroke, and to add or remove keystrokes.

Moreover, a conventional wired keyboard requires operating power supplied by a computer system, and if wirelessly transmitting the key values is requested, a wireless transmitting module and a power storage device, such as battery, are required to ensure normal operation. Under such a condition, if the battery runs out of electricity, the wireless keyboard suspends, affecting convenience of usage.

As can be seen, the prior art keyboard lacks of flexibility of keystroke allocation and cannot meet a user's demand for adjusting the positions or key values of the keystrokes, and adding or removing keystrokes. In addition to the above drawbacks, the prior art wireless keyboard further requires a power storage device, which may be out of use due to battery power insufficiency, affecting convenience of usage.

SUMMARY OF THE INVENTION

It is therefore a primary objective of the claimed invention to provide a wireless keyboard and a computer system.

The present invention discloses a wireless keyboard for a computer system, which comprises at least a keystroke and a reader. Each of the at least a keystroke comprises a first resonating circuit for responsing a first wireless signal to generate an induced electromotive force and provide a power source, a chip for storing a key data, and a switch coupled between the first resonating circuit and the chip for conducting a connection between the first resonating circuit and the chip when receiving an external force, to transmit the power source provided by the first resonating circuit to the chip, such that the chip outputs the key data as a second wireless signal via the first resonating circuit. The reader is coupled to the a computer system, and utilized for emitting the first wireless signal to the each keystroke and responsing the second wireless signal outputted by the each keystroke, so as to determine commands inputted to the computer system.

The present invention further discloses a computer system, comprises a host and a wireless keyboard. The wireless keyboard comprises at least a keystroke and a reader. Each of the at least a keystroke comprises a first resonating circuit for responsing a first wireless signal to generate an induced electromotive force and provide a power source, a chip for storing a key data, and a switch coupled between the first resonating circuit and the chip for conducting a connection between the first resonating circuit and the chip when receiving an external force, to transmit the power source provided by the first resonating circuit to the chip, such that the chip outputs the key data as a second wireless signal via the first resonating circuit. The reader is coupled to the a computer system, and utilized for emitting the first wireless signal to the each keystroke and responsing the second wireless signal outputted by the each keystroke, so as to determine commands inputted to the computer system.

These and other objectives of the present invention will no doubt become obvious to those of ordinary skill in the art after reading the following detailed description of the preferred embodiment that is illustrated in the various figures and drawings.

DETAILED DESCRIPTION

To improve the drawbacks of the prior art keyboard, the present invention utilizes a radio frequency identification (RFID) technique to realize a wireless keyboard, which is allowed to change positions or key values of keystrokes, or to add or remove keystrokes. Firstly, the RFID technique is a non-contact automatic recognition technique, and mainly composed of an electric tag, a reader and a related application system. The electric tag works as a transponder, and is composed of a chip including analog, digital and memory functionalities, and an antenna designed for various frequencies and application environments. The reader is mainly composed of an analog control unit, a digital control unit, a microprocessing unit and a set of reading antennas. The application system is a middleware, for retrieving or receiving internal digital information of the electric tag through a wired or a wireless method, and utilizing the information coordinated with various application requirements to perform further processes. The RFID system has the advantages of non-contact reading, data renewable, high data storage capacity, reusable, high data security, and small volume of the RFID chip, so that the present invention applies the RFID technique to a wireless keyboard, for improving the drawbacks of the prior art.

Figure 2:
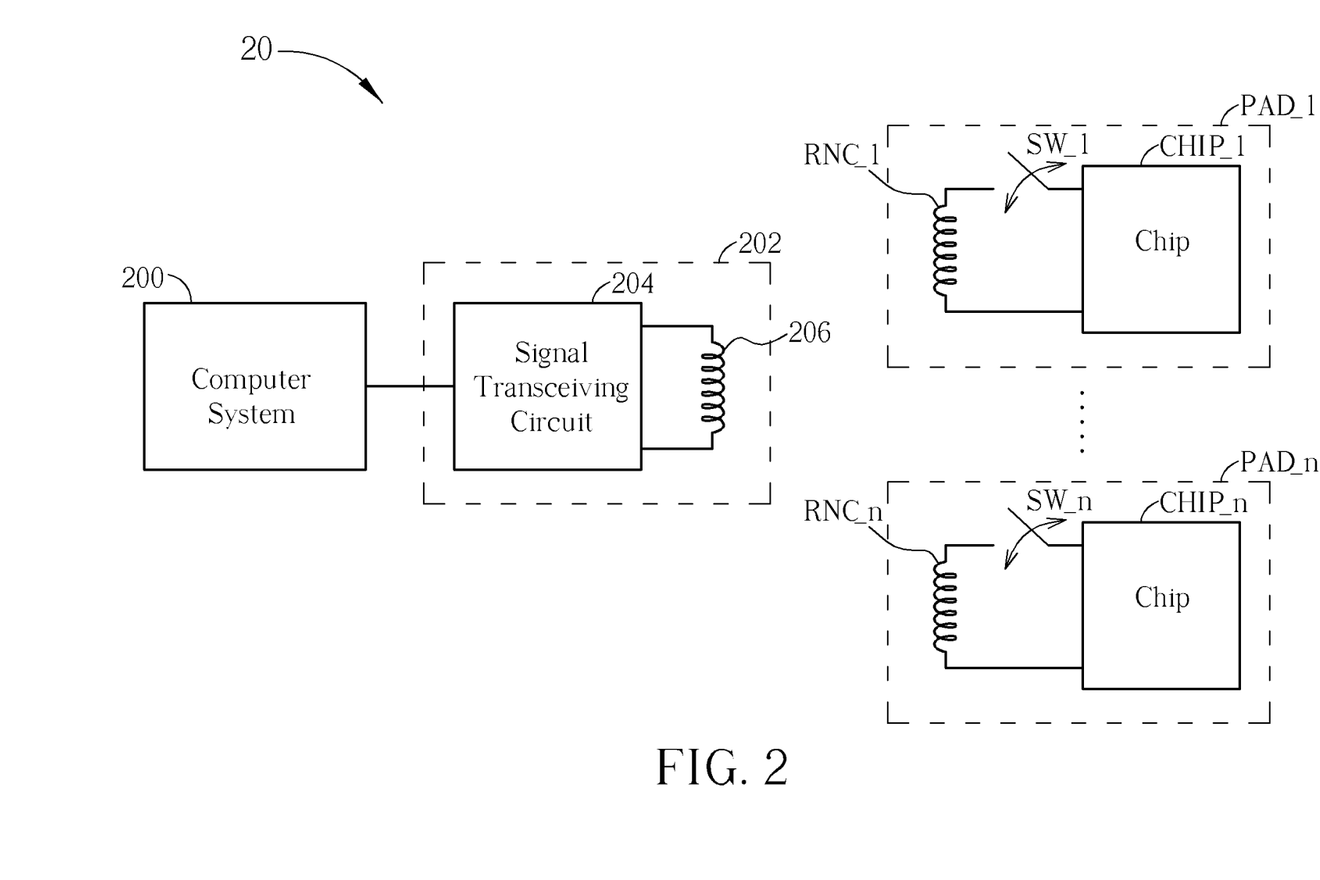
FIG. 2 is a schematic diagram of a wireless keyboard according to an embodiment of the present invention.

Please refer to FIG. 2, which is a schematic diagram of a wireless keyboard 20 according to an embodiment of the present invention. The wireless keyboard 20 is used in a computer system 200, and includes a reader 202 and keystrokes PAD_1-PAD_n. The reader 202 is coupled to the computer system 200, and composed of a signal transceiving circuit 204 and a resonating circuit 206. The signal transceiving circuit 204 emits wireless signals through the resonating circuit 206 to the keystrokes PAD_1-PAD_n, or inducts the wireless signals output from the keystrokes PAD_1-PAD_n, to determine the contents of commands inputted to the computer system 200. The keystrokes PAD_1-PAD_n are composed of the resonating circuits RNC_1-RNC_n, chips CHIP_1-CHIP_n and switches SW_1-SW_n respectively. Operating principles of the keystrokes PAD_1-PAD_n are substantially the same. Therefore, for sake of clarity, the following description takes the keystroke PAD_1 as an example. The resonating circuit RNC_1 can induct wireless signals output from the resonating circuit 206, so that the resonating circuit RNC_1 and the frequency resonating circuit 206 are coupled to each other via an alternating current (AC) magnetic field, and such coupling triggers the resonating circuit RNC_1 to generate an induced electromotive force, providing adequate power source for the chip CHIP_1 to work, and making the reader 202 and the keystroke PAD_1 capable of performing bi-directional communication. The chip CHIP_1 stores a key data or key value, and can read and output the key data when power is supplied for the chip CHIP_1. The switch SW_1 is coupled between the resonating circuits RNC_1 and the chip CHIP_1, and can conduct an electric connection between the resonating circuit RNC_1 and the chip CHIP_1 when the switch SW_1 is pressed by an external force, so as to conduct power source provided by the resonating circuit RNC_1 to the chip CHIP_1, so that the chip CHIP_1 can output the stored key data as wireless signals through the resonating circuit RNC_1, and send the wireless signals out to the reader 202.

In brief, the keystrokes PAD_1-PAD_n are similar to a variety of electric tags in an RFID system, while the difference is that the keystrokes PAD_1-PAD_n induct the wireless signals from the reader 202 only when the switches SW_1-SW_n are pressed, and reply the stored key data in the chips CHIP_1-CHIP_n accordingly. In other words, when a user presses a keystroke, the reader 202 will receive the key data or key value stored in the keystroke, and will not receive key data or key values stored in other keystrokes.

In addition, in the keystrokes PAD_1-PAD_n, the key data stored in the chips CHIP_1-CHIP_n can be preset in the system or defined by a user. If "defined by the user" is required, the chips CHIP_1-CHIP_n can respectively include a key data updating unit or a corresponding firmware, for receiving control signals output from the user for updating the stored key data. However, the updating method is not limited to specific processes. For example, in an embodiment, the computer system 200 includes a key value configuration software, which can be executed by the user to send a key value configuration command through the signal transceiving circuit 204 to a specific keystroke, so that the key data updating unit of the specific keystroke can update the stored key value accordingly. Under such a condition, the user can arbitrary set the key value of each keystroke; for example, the user can store his/her name, phone number and address in various chips, and when the user needs to input some of these data, the user can quickly finish the inputting process; thus, efficiency is improved.

Moreover, since the wireless keyboard 20 adopts the RFID technique, the keystrokes PAD_1-PAD_n are powered by the reader 202 using the method of AC magnetic field coupling. In other words, the keystrokes PAD_1-PAD_n are not required to include physical wires or connect to power supplies. Under such a condition, the keystrokes PAD_1-PAD_n can be designed as independent pieces respectively, namely mechanically independent elements, such that flexibility of keystroke allocation is greatly improved accordingly.

Figure 3A:
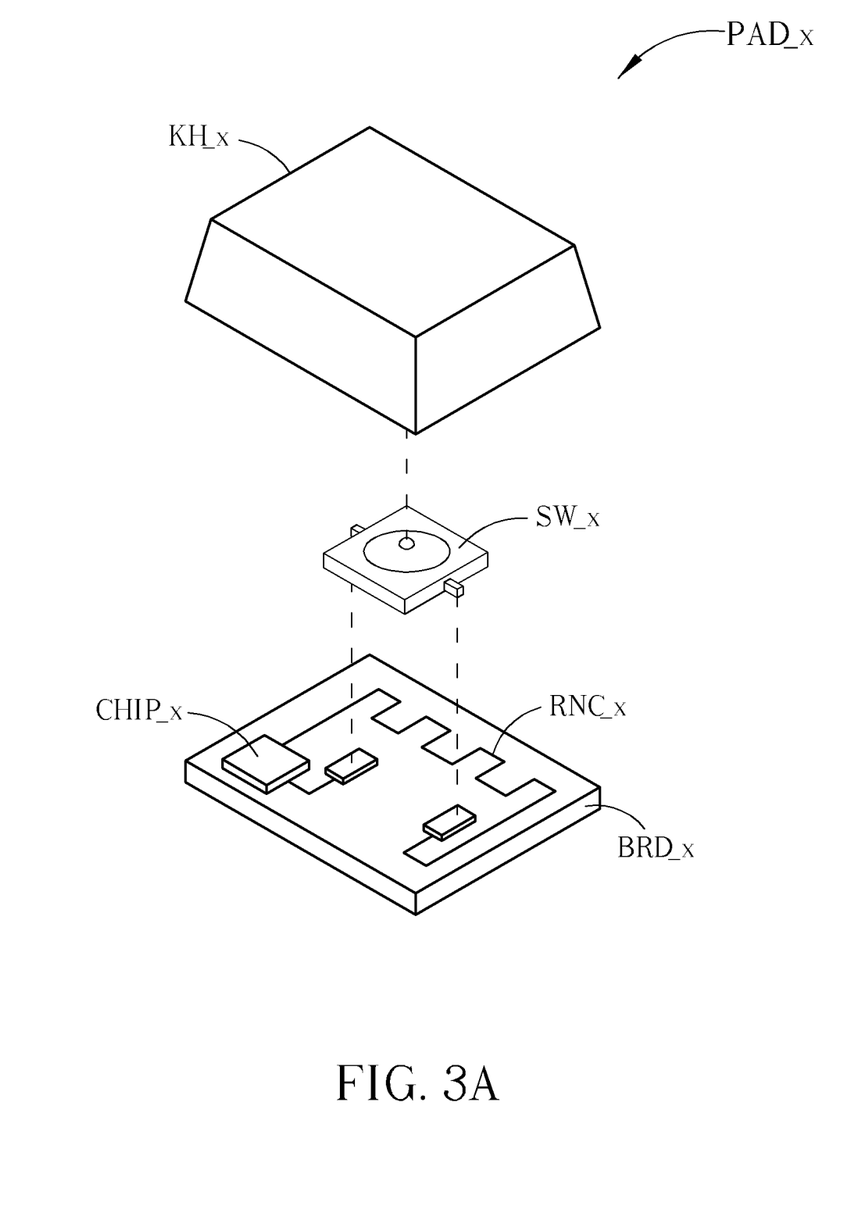
FIG. 3A to FIG. 3C are schematic diagrams of explosion, combination, and cutaway view of the keystroke shown in FIG. 2.
Figure 3B:
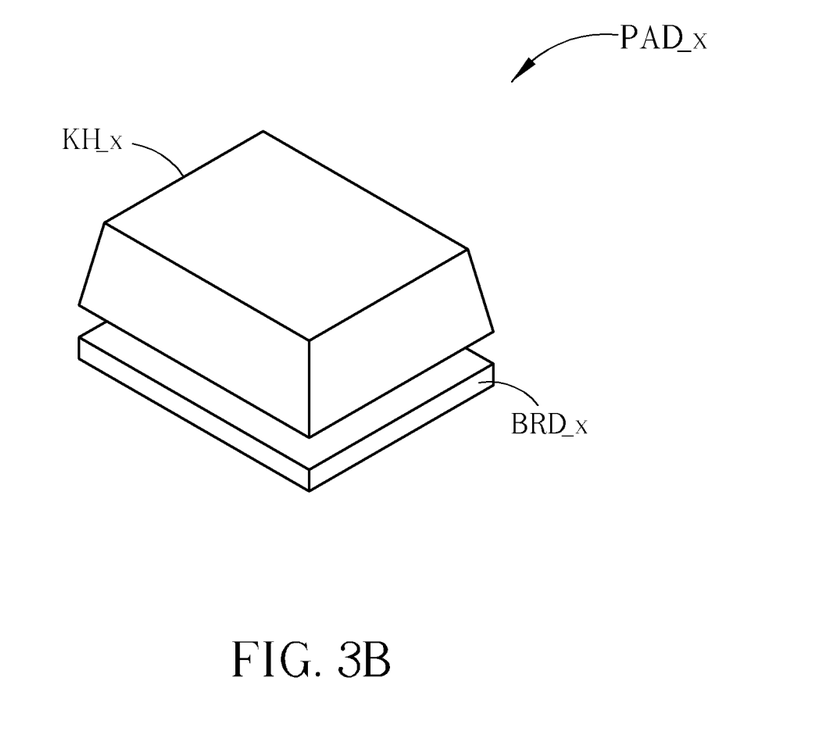
Figure 3C:
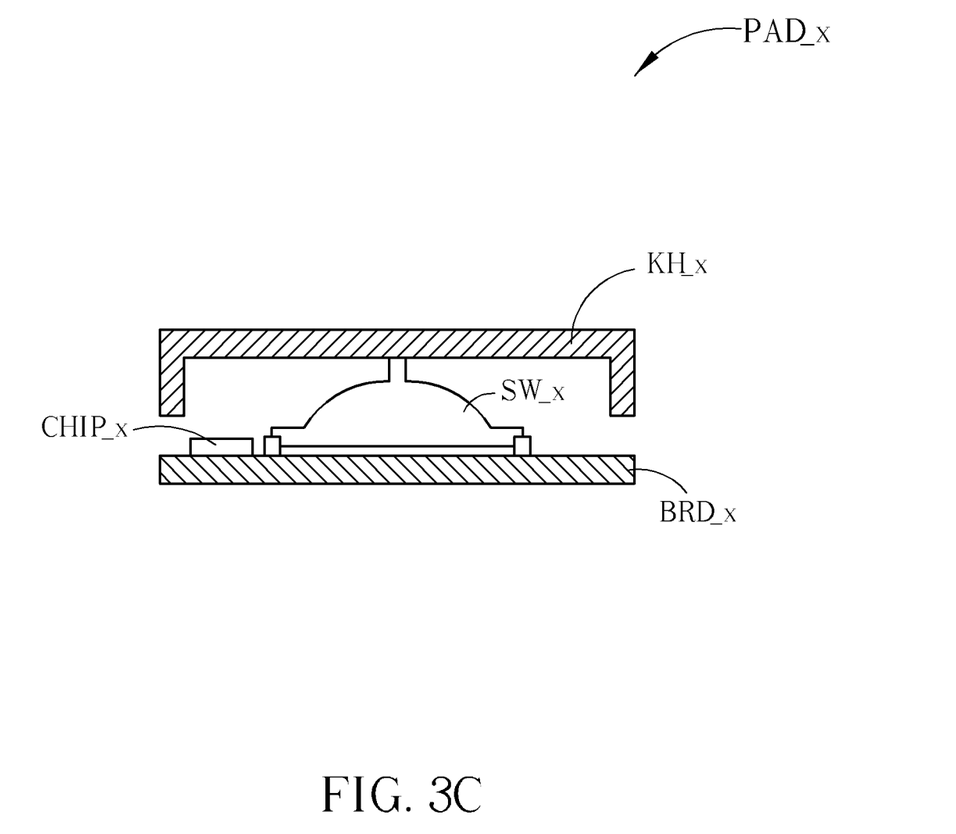

For example, please refer to FIG. 3A to FIG. 3C, which are schematic diagrams of explosion, combination, and cutaway view of a keystroke PAD_x of the keystrokes PAD_1-PAD_n. As illustrated in FIG. 3A to FIG. 3C, a resonating circuit RNC_x of the keystroke PAD_x and a chip CHIP_x are disposed on a base plate BRD_x; a switch SW_x includes a flexible structure, and is covered by a key cap KH_x with a specific symbol painted to represent key data of the keystroke PAD_x. As a result, when a user presses the key cap KH_x, the switch SW_x is triggered to conduct the resonating circuit RNC_x and the chip CHIP_x.

As illustrated in FIG. 3A to FIG. 3C, the keystroke PAD_x does not need to connect with the other keystrokes or the reader 202 in view of either the structure or the electric circuitry, and therefore, the keystroke PAD_x can be independently allocated. Certainly, for convenience of usage, fastening structures such as hooks or tenons, or binding structures such as backing adhesive or magnetic materials can be added, in order to fix the keystroke PAD_x to the other keystrokes or an object. For example, the four sides of the base plate BRD_x can include fastening structures that can hook other base plates, such that the base plate BRD_x and the base plates of the other keystrokes can be fixed together. Or, the button of the base plate BRD_x can coated with backing adhesive or magnetic materials, such that the base plate BRD_x can stick on a plane surface or a metal surface. As a result, a user can easily allocate the keystrokes PAD_1-PAD_n.

On the other hand, the main concept of the present invention is to use the RFID technique, such that the wireless keyboard 20 can meet the user's demand for adjusting positions or key values of the keystrokes, and adding or removing keystrokes; meanwhile, the wireless keyboard 20 does not require power storage devices such as batteries, so as to enhance convenience of usage. Besides, those skilled in the art can make modifications accordingly. For example, because a inductive distance of a passive RFID technique is restricted, if the inductive distance is required to be extended, independent power sources can be further settled for the keystrokes PAD_1-PAD_n, and the passive RFID technique becomes a semi-passive or an active radio RFID technique, in order to extend the distance for use. Shapes of the keystrokes PAD_1-PAD_n are not restricted to squares, and can be long straps, circles, etc. Or, the keystrokes PAD_1-PAD_n can be classified into various blocks according to the functionalities, e.g. number blocks or character blocks.

Figure 4:
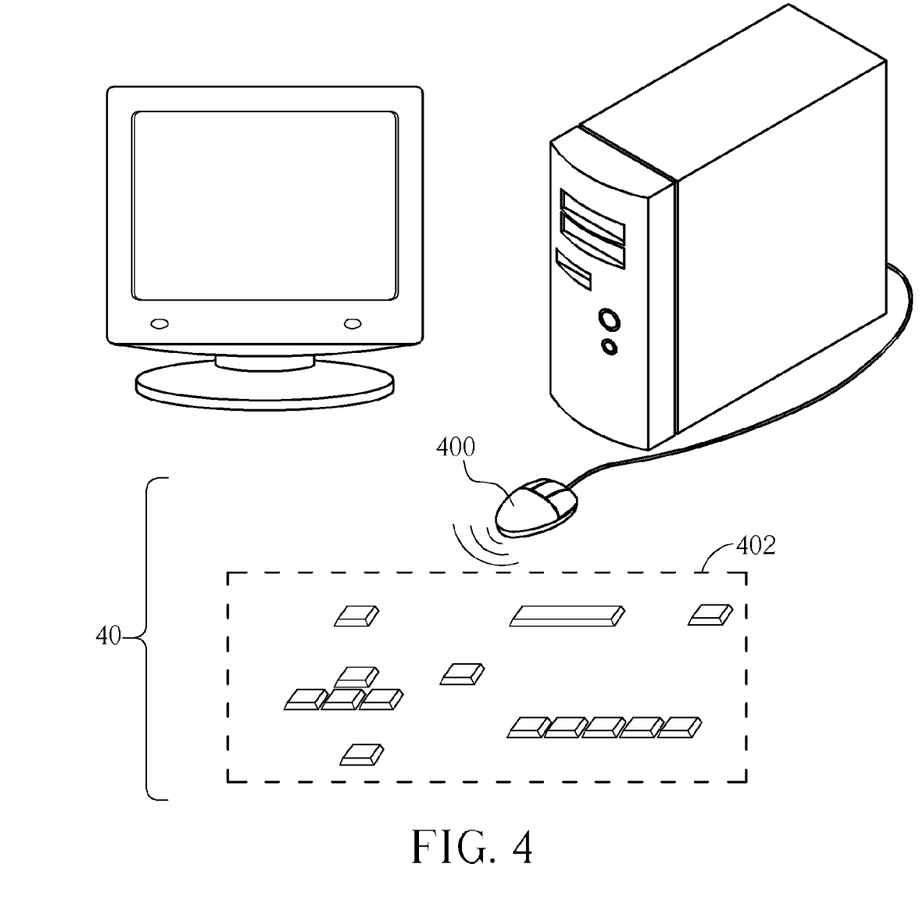
FIG. 4 is a schematic diagram of a wireless keyboard according to an embodiment of the present invention.

Moreover, the computer system 200 represents all types of computer systems that can receive data inputted by a user, such as a laptop, a tablet, a smart phone or a PDA. According to various applications, a designer can properly adjust appearance or manufacturing of the wireless keyboard 20 according to system requirements. For example, FIG. 4 is a schematic diagram of a wireless keyboard 40 according to an embodiment of the present invention. The wireless keyboard 40 is derived from the wireless keyboard 20, and basic structures of the wireless keyboard 40 and the wireless keyboard 20 are identical. The wireless keyboard 40 is used for a PC system; therefore, a reader 400 thereof connects with the host through physical wires, while keystrokes are allocated in an area 402 according to user's demand.

Figure 5:
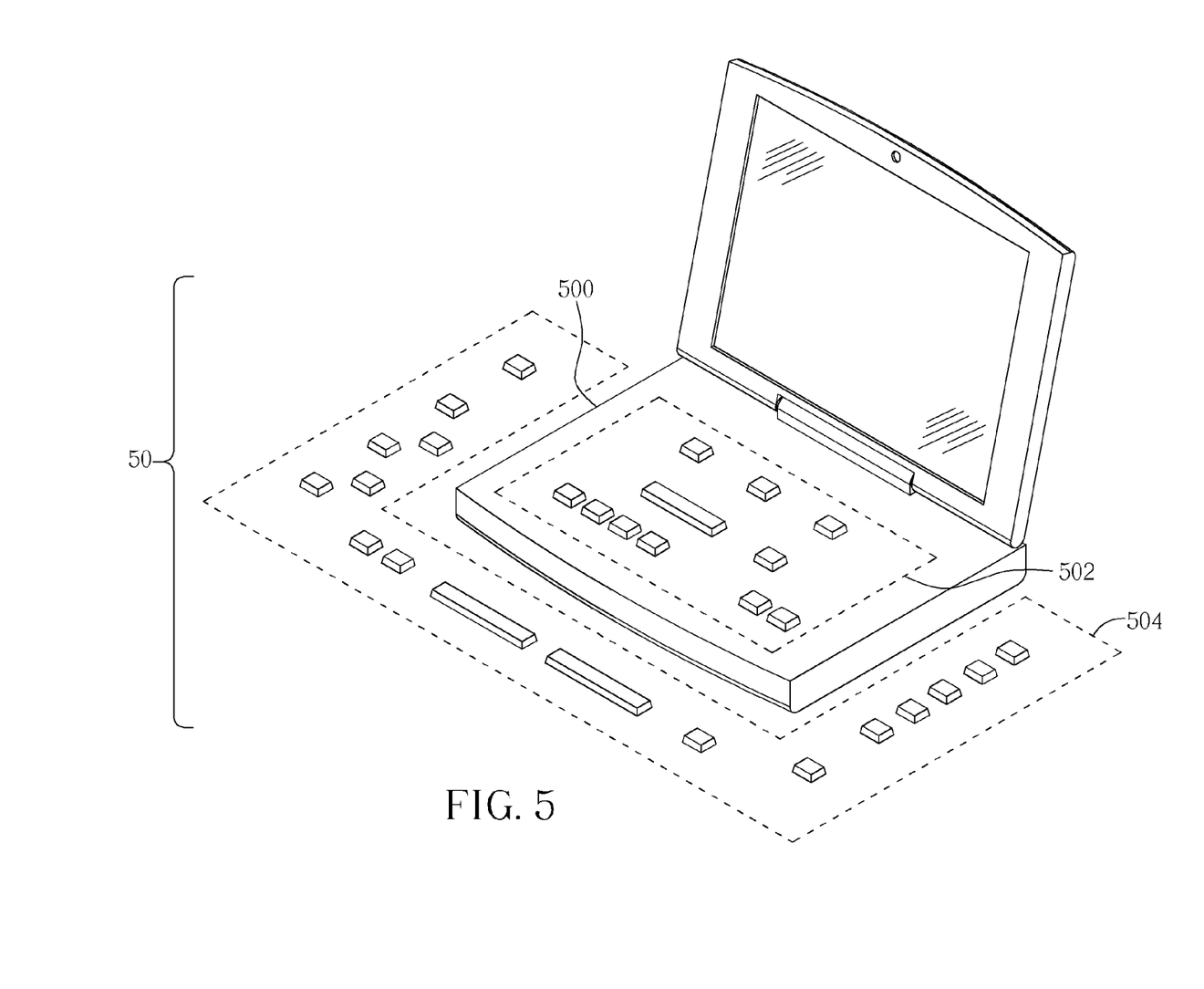
FIG. 5 is a schematic diagram of a wireless keyboard according to an embodiment of the present invention.

Furthermore, FIG. 5 is a schematic diagram of a wireless keyboard 50 according to an embodiment of the present invention. The wireless keyboard 50 is derived from the wireless keyboard 20, and the basic structures of the wireless keyboard 50 and the wireless keyboard 20 are identical. The wireless keyboard 50 is used for a laptop system; therefore, a reader 500 thereof is disposed in a host (i.e., a chassis of the laptop system), and keystrokes are allocated in an area 502 on the chassis or an area 504 surrounding the area 502 according to user's demand.

The prior art keyboard lacks of flexibility of keystroke allocation and cannot meet the user's demand for adjusting the positions or key values of the keystrokes, and adding or removing keystrokes. In addition to the above drawbacks, the prior art wireless keyboard requires a power storage device, which may be out of use due to battery power insufficiency, affecting convenience of usage. In comparison, the wireless keyboard of the present invention can meet the user's demand for adjusting keystroke allocation or key values, and adding or removing keystrokes; and meanwhile, the wireless keyboard of the present invention does not require a power storage device such as battery, which further enhance convenience of usage.

In conclusion, the wireless keyboard of the present invention has the flexibility of keystroke allocation, to enhance convenience of usage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless keyboard for a computer system, comprising:
    at least a keystroke, each comprising:
        a first resonating circuit, for responding a first wireless signal to generate an induced electromotive force and provide a power source;
        a chip, for storing a key data;
        a switch, coupled between the first resonating circuit and the chip, for conducting a connection between the first resonating circuit and the chip when receiving an external force, to transmit the power source provided by the first resonating circuit to the chip, such that the chip outputs the key data as a second wireless signal via the first resonating circuit;
        a base plate, for deploying the first resonating circuit, the chip and the switch, wherein the base plate comprises at least one fastening structure and a binding structure for connecting a base plate of another keystroke or fixing the base plate, wherein the at least one fastening structure is disposed on at least one lateral side of the base plate, and the binding structure comprises magnetic materials; and
        an independent power source, for extending a distance for use; and
    a reader, coupled to the computer system, for emitting the first wireless signal to the each keystroke and responding the second wireless signal outputted by the each keystroke, so as to determine commands inputted to the computer system, wherein a key value configuration software of the computer system sends a key value configuration command through the reader to the each keystroke.

2. The wireless keyboard of claim 1, wherein the chip of the each keystroke comprises a key data updating unit for receiving a control signal to update the key data stored in the chip.

3. The wireless keyboard of claim 1, wherein each of the at least a keystroke further comprises a key cap, covering the base plate, for switching the switch.

4. The wireless keyboard of claim 1, wherein the reader comprises:
    a second resonating circuit; and
    a signal transceiving circuit, coupled to the second resonating circuit, for emitting the first wireless signal via the second resonating circuit, or responding the second wireless signal via the second resonating circuit.

5. A computer system, comprising:
    a host; and
    a wireless keyboard, comprising:
    at least a keystroke, each comprising:
        a first resonating circuit, for responding a first wireless signal to generate an induced electromotive force and provide a power source;
        a chip, for storing a key data;
        a switch, coupled between the first resonating circuit and the chip, for conducting a connection between the first resonating circuit and the chip when receiving an external force, to transmit the power source provided by the first resonating circuit to the chip, such that the chip outputs the key data as a second wireless signal via the first resonating circuit;
        a base plate, for deploying the first resonating circuit, the chip and the switch, wherein the base plate comprises at least one fastening structure and a binding structure for connecting a base plate of another keystroke or fixing the base plate, wherein the at least one fastening structure is disposed on at least one lateral side of the base plate, and the binding structure comprises magnetic materials; and
        an independent power source, for extending a distance for use; and
    a reader, coupled to the host, for emitting the first wireless signal to the each keystroke and responding the second wireless signal outputted by the each keystroke, so as to determine commands inputted to the computer system, wherein a key value configuration software of the host sends a key value configuration command through the reader to the each keystroke.

6. The computer system of claim 5, wherein the chip of the each keystroke comprises a key data updating unit for receiving a control signal to update the key data stored in the chip.

7. The computer system of claim 5, wherein each of the at least a keystroke further comprises a key cap, covering the base plate, for switching the switch.

8. The computer system of claim 5, wherein the reader comprises:
    a second resonating circuit; and
    a signal transceiving circuit, coupled to the second resonating circuit, for emitting the first wireless signal via the second resonating circuit, or responding the second wireless signal via the second resonating circuit.

* * * * *